United States Patent [19]

Reime et al.

[11] 4,082,988
[45] Apr. 4, 1978

[54] ELECTRIC POWER PLANT FOR MOTOR DRIVEN VEHICLES

[75] Inventors: Roy O. Reime, San Jose; Byron C. Stewart, Campbell, both of Calif.

[73] Assignee: Richard Dorst, Atherton, Calif.

[21] Appl. No.: 574,666

[22] Filed: May 5, 1975

Related U.S. Application Data

[63] Continuation-in-part of Ser. No. 347,103, Apr. 2, 1973, abandoned, which is a continuation-in-part of Ser. No. 157,203, Jun. 28, 1971, abandoned.

[51] Int. Cl.² .............................................. H02P 7/28
[52] U.S. Cl. ..................... 318/139; 318/341; 318/376; 307/144
[58] Field of Search ............. 318/139, 341, 376; 290/14, 17; 307/144

[56] References Cited

U.S. PATENT DOCUMENTS

| 3,243,681 | 3/1966 | Dannettell | 318/139 X |
| 3,500,161 | 3/1970 | Domann et al. | 318/139 |
| 3,546,548 | 12/1970 | Wouk | 318/139 |
| 3,596,105 | 7/1971 | Segrest | 290/46 |
| 3,621,929 | 11/1971 | Oberthur | 318/139 X |
| 3,686,549 | 2/1971 | Winebrenner | 318/139 |
| 3,716,767 | 2/1973 | Kuriyama et al. | 318/139 |
| 3,735,220 | 5/1973 | Renner et al. | 318/139 |
| 3,750,002 | 7/1973 | Gerhard | 318/139 X |
| 3,753,059 | 8/1973 | Berman | 318/139 |
| 3,792,742 | 2/1974 | Mager | 318/139 X |

*Primary Examiner*—B. Dobeck
*Attorney, Agent, or Firm*—Townsend and Townsend

[57] ABSTRACT

A battery operated electric power plant for motor driven vehicles powered by rechargeable electric storage batteries and one or more dynamoelectric devices capable of operation both as a motor for driving the vehicle and as a generator for recharging the batteries. Electronic switching circuitry cyclically alternates operation of the dynamoelectric devices in a motor phase and generator phase during each cycle and varies the relative duration of the motor phase and generator phase during each cycle according to the power demand on the electric motor.

20 Claims, 17 Drawing Figures

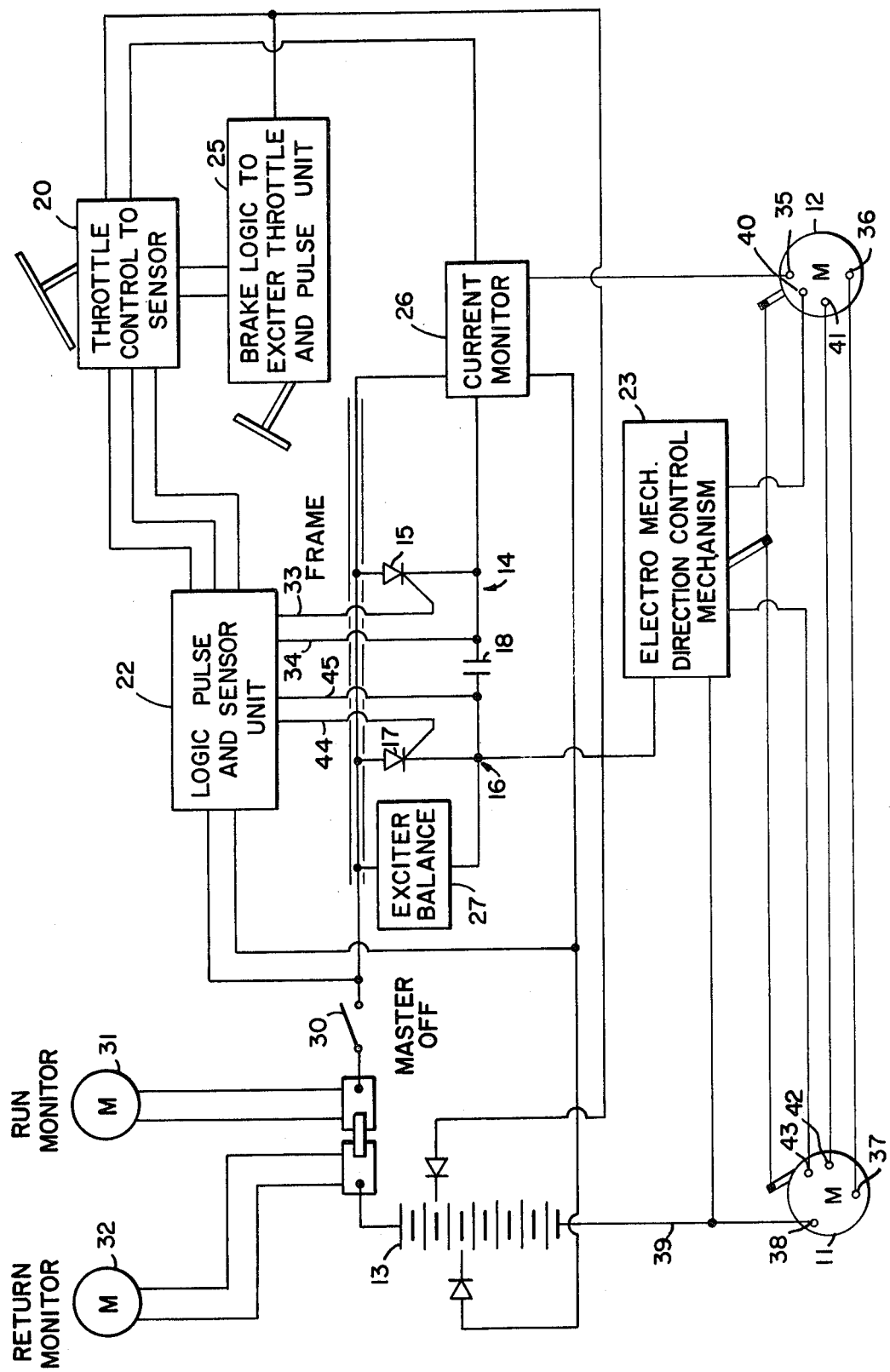
FIG_1

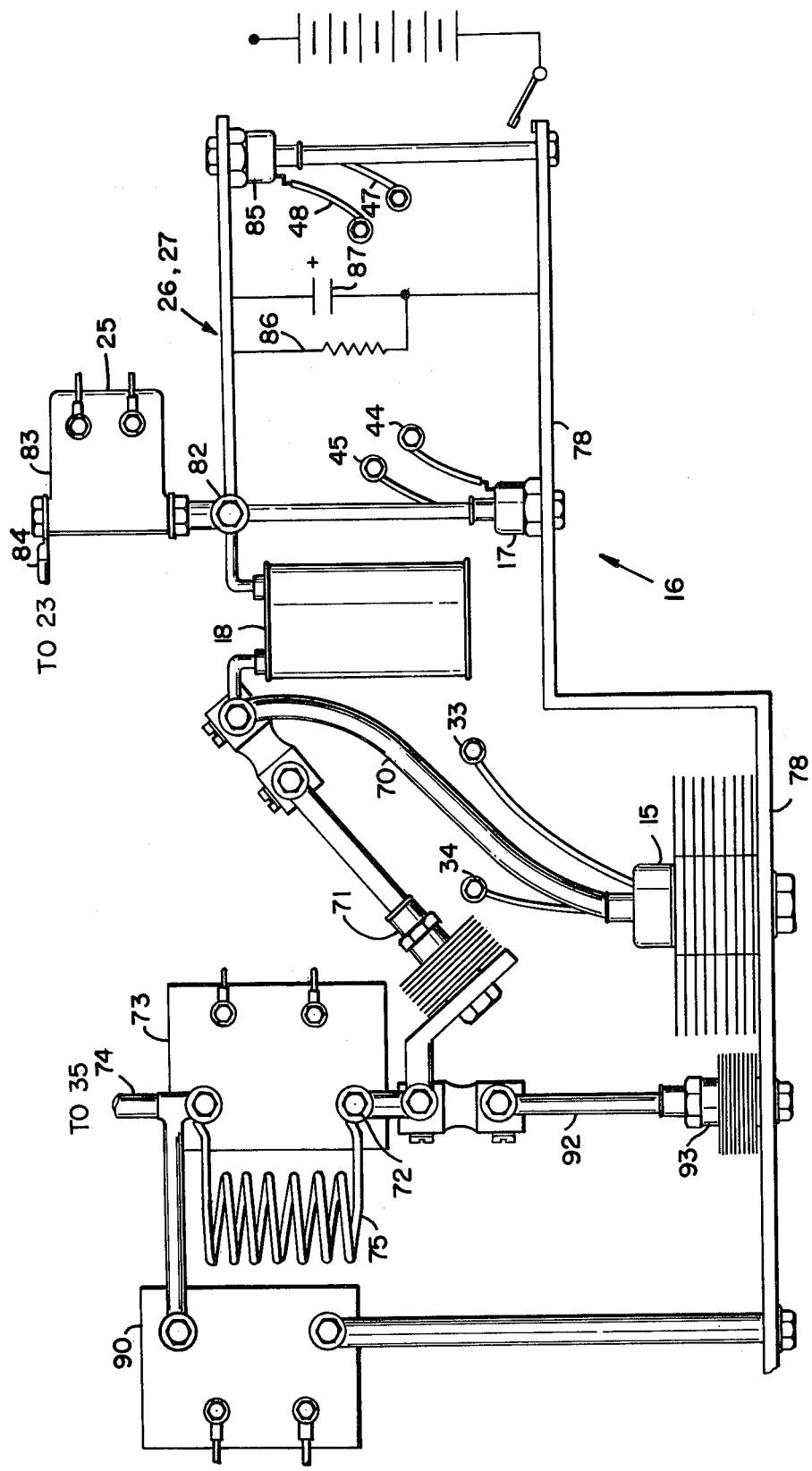
FIG_2

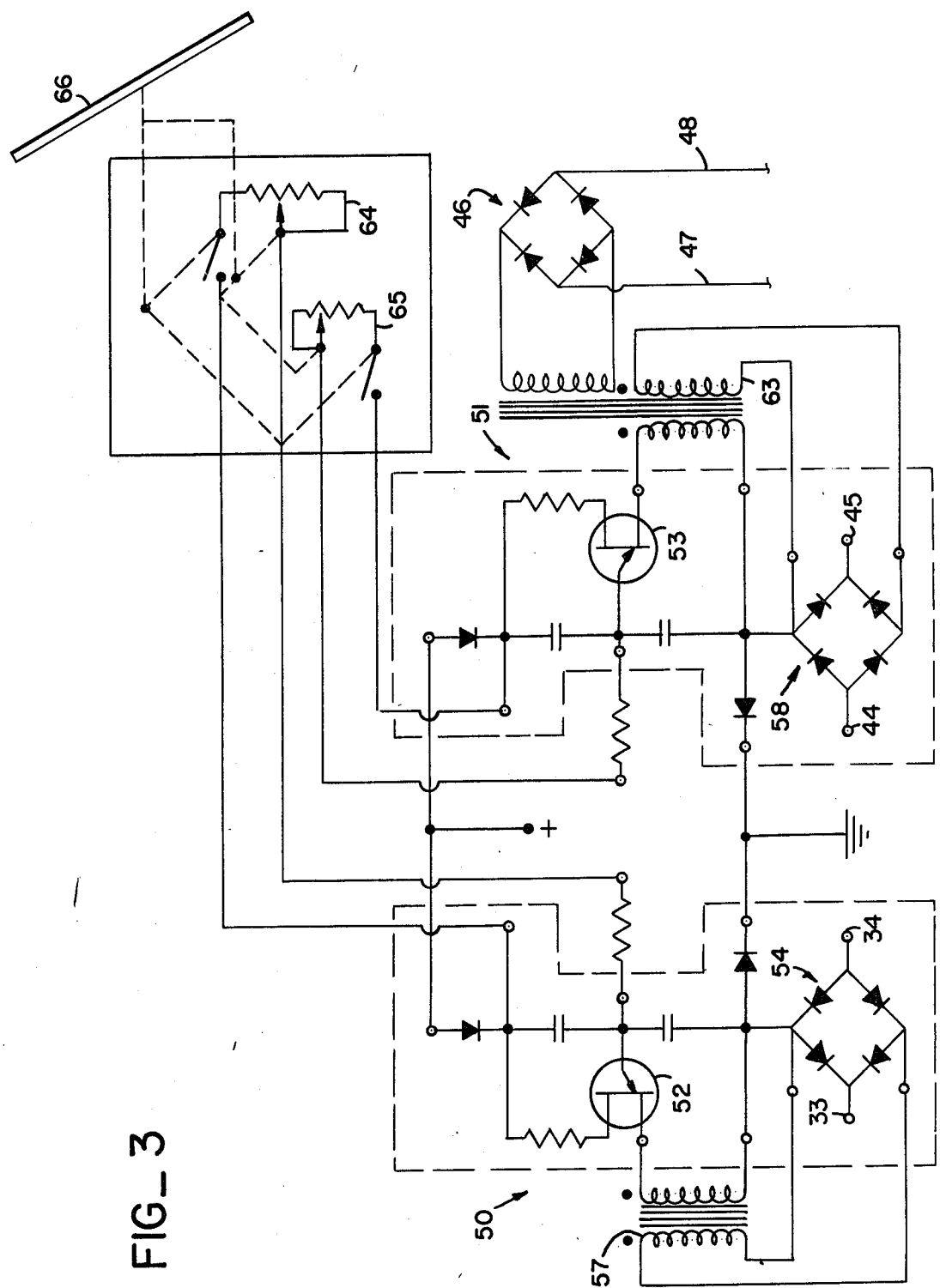
FIG_3

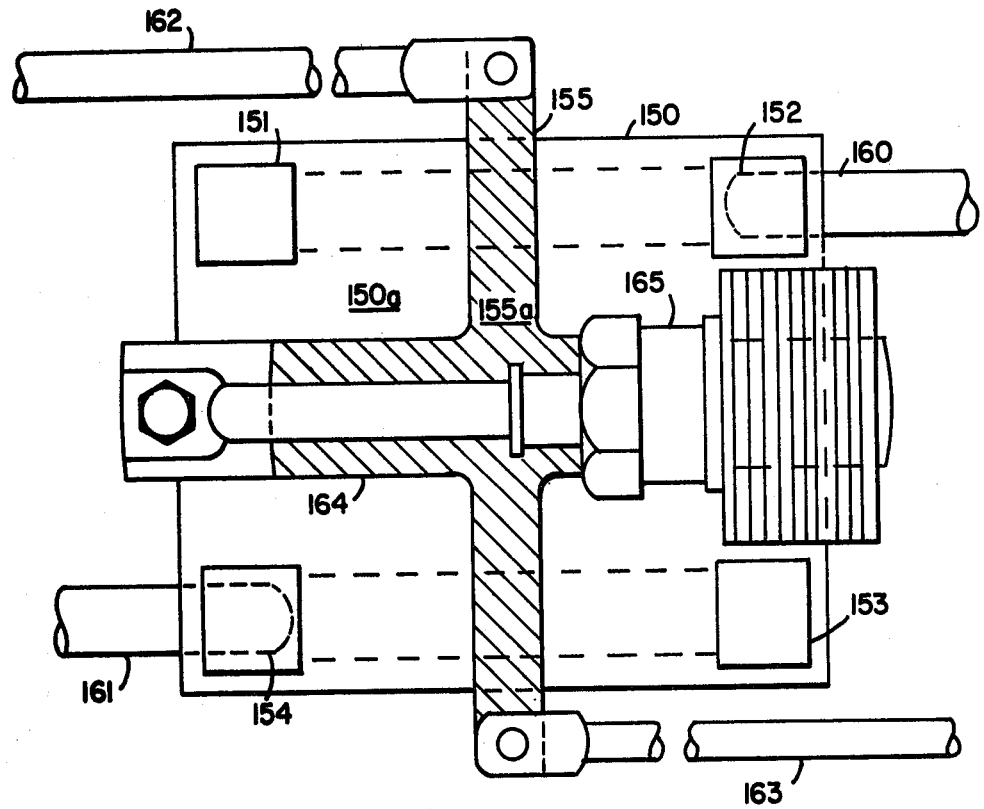
FIG_4
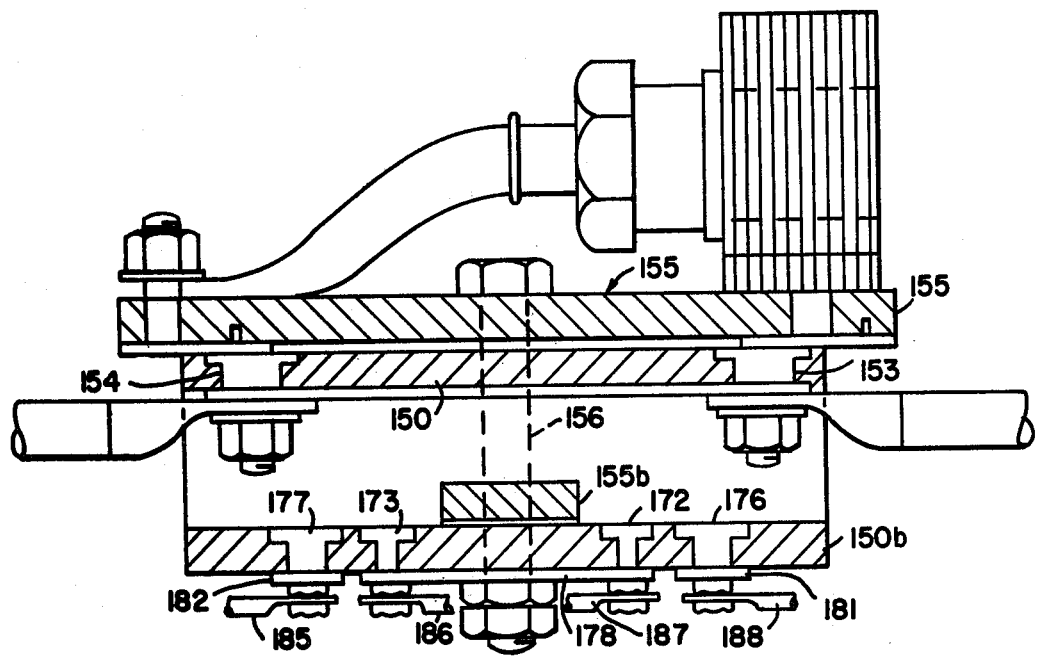
FIG_5

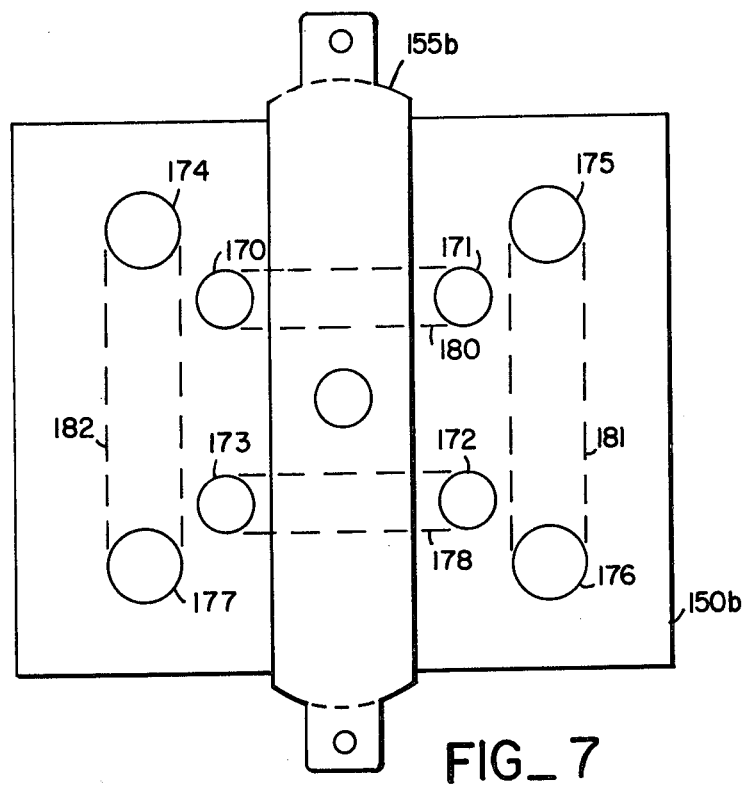
FIG_7
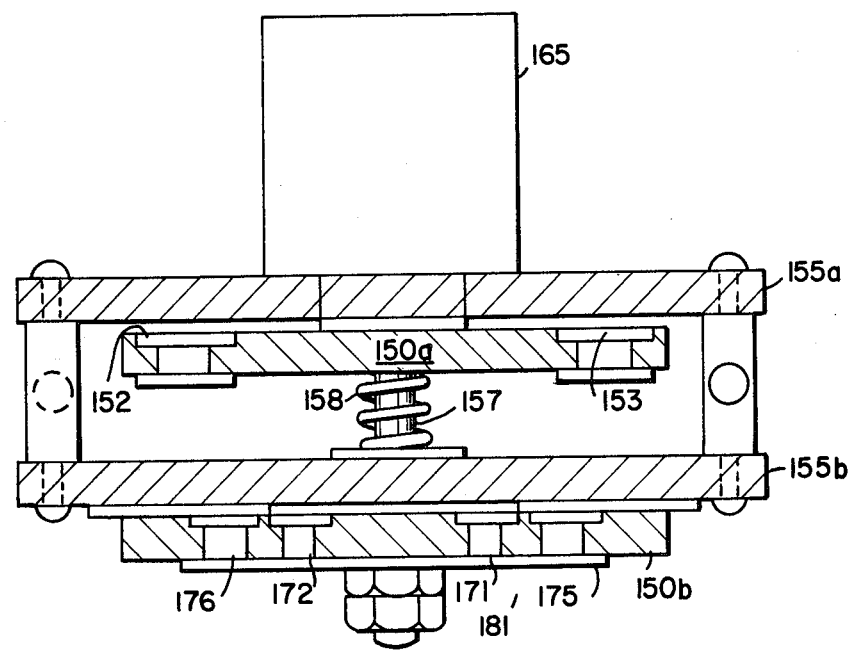
FIG_6

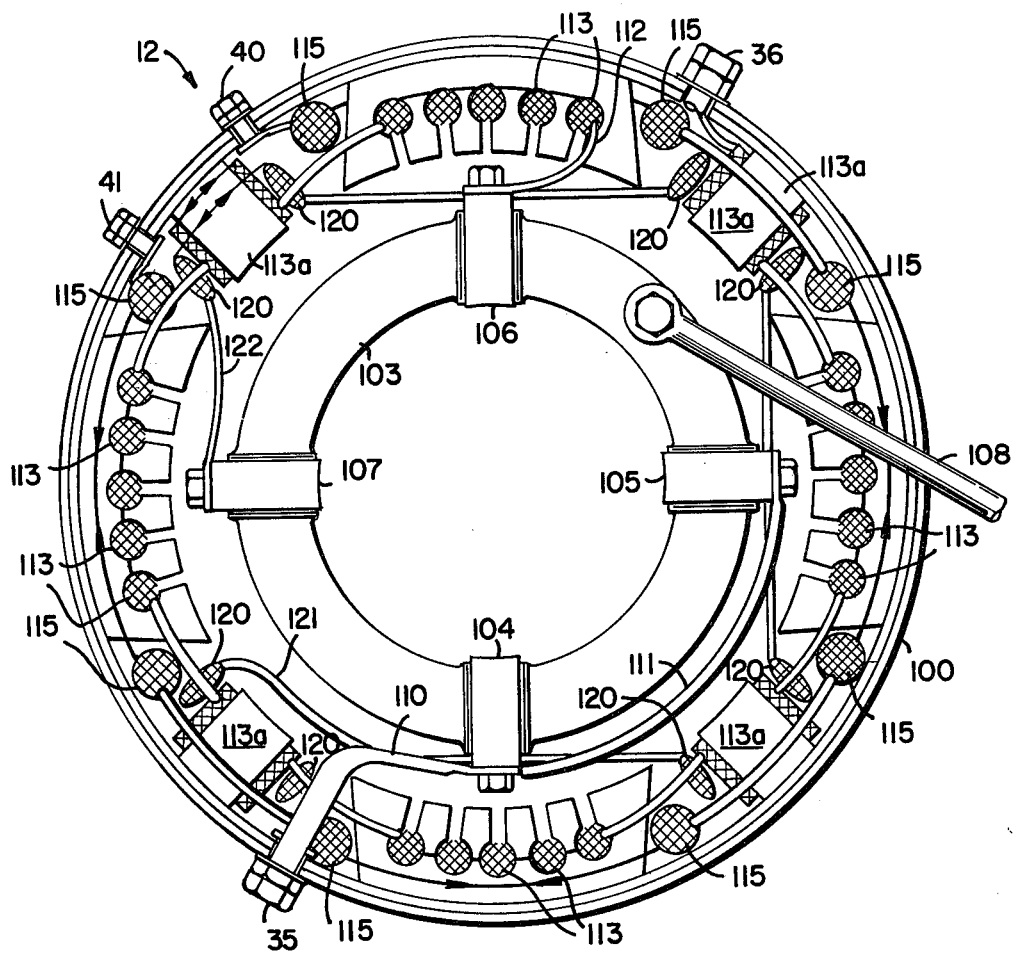
FIG_8
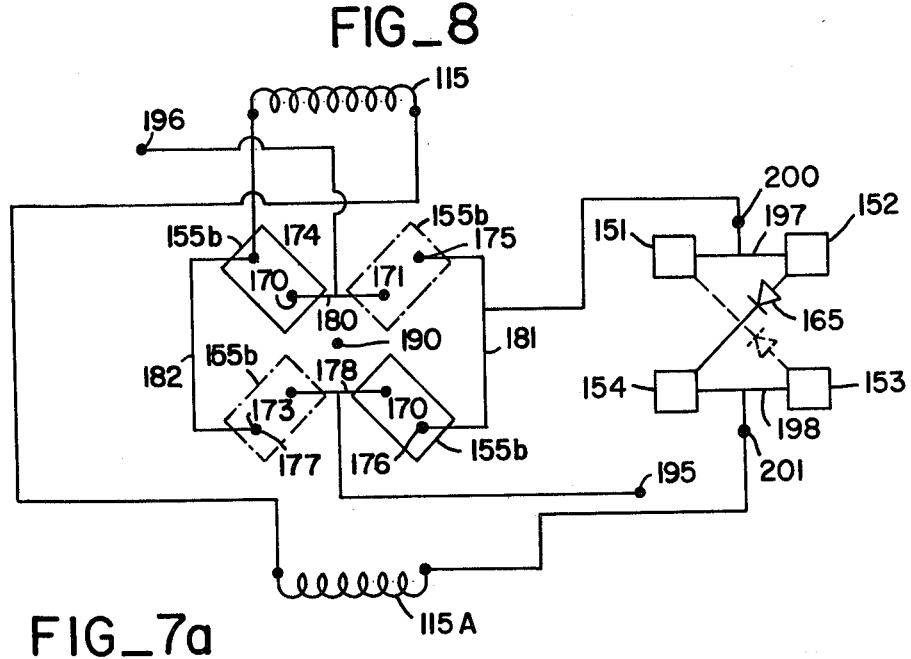
FIG_7a

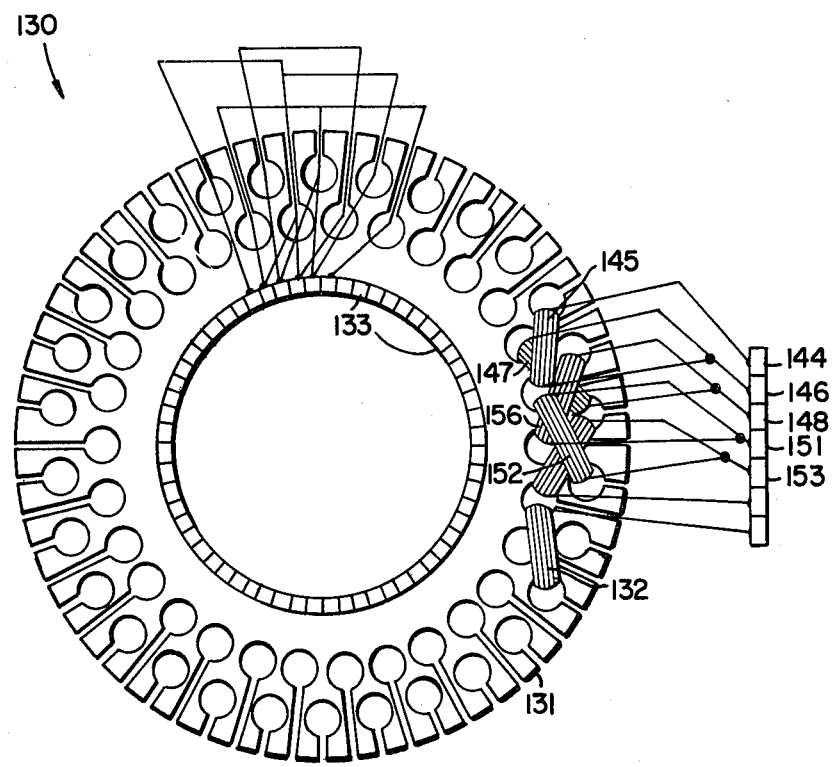
FIG_9
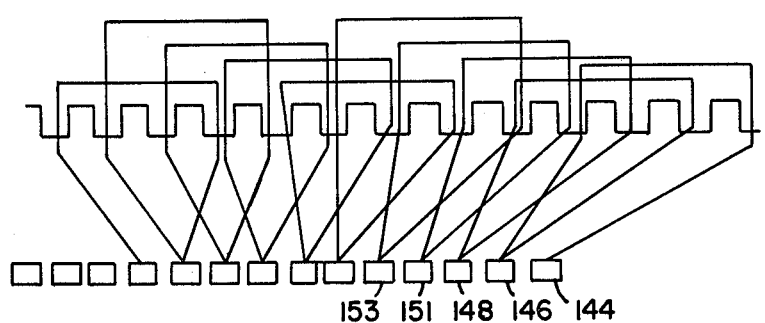
FIG_10

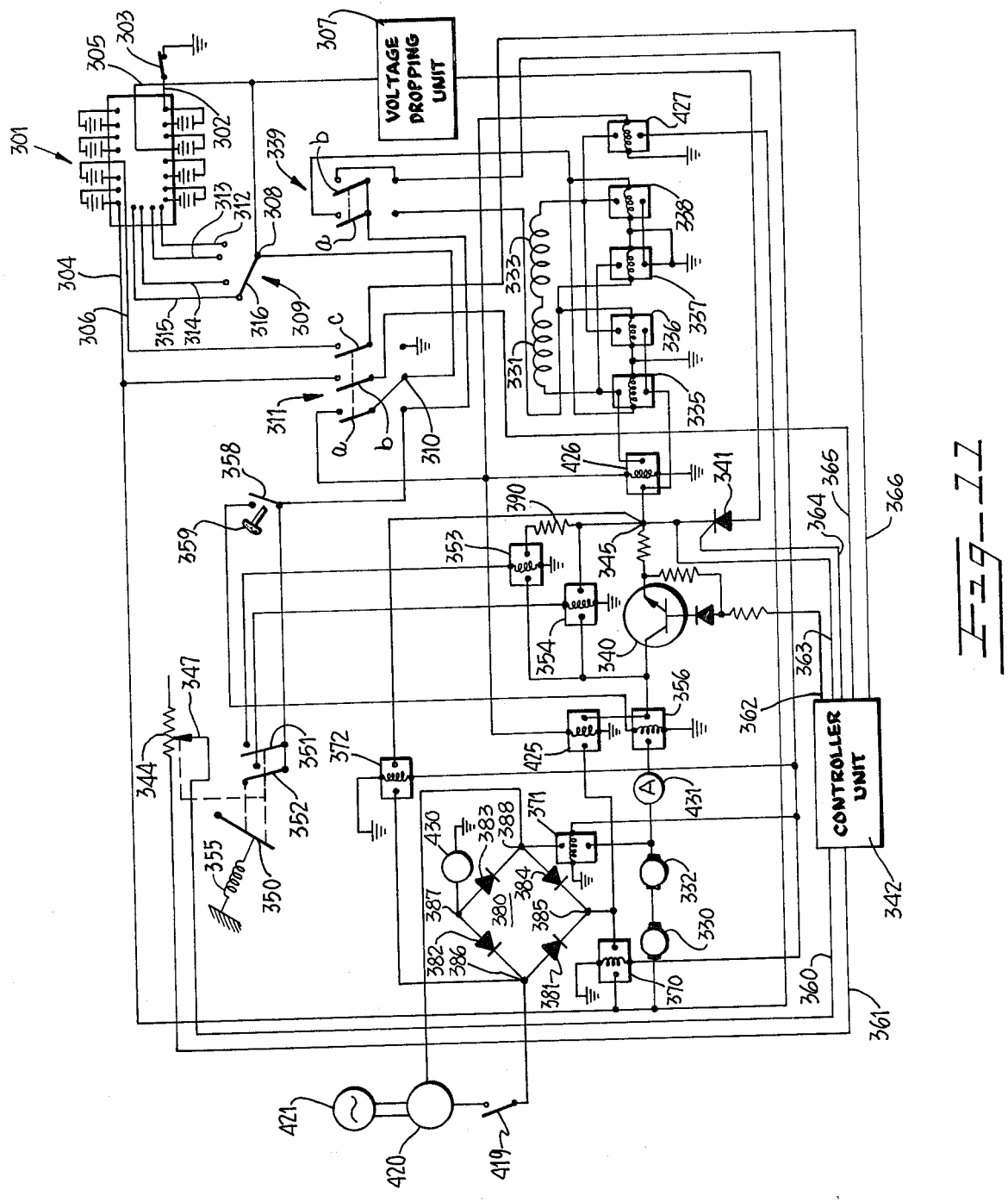

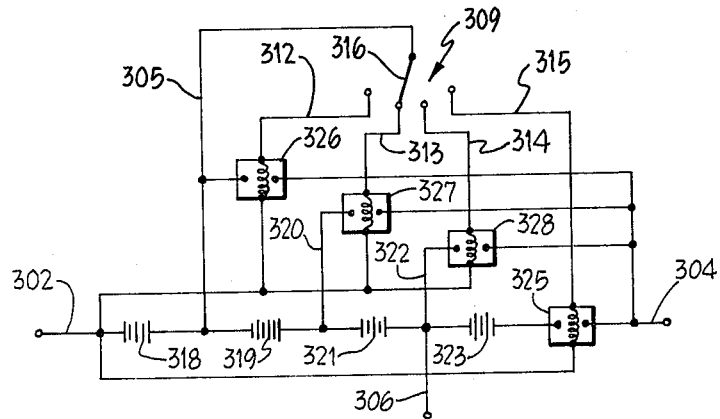
Fig_12
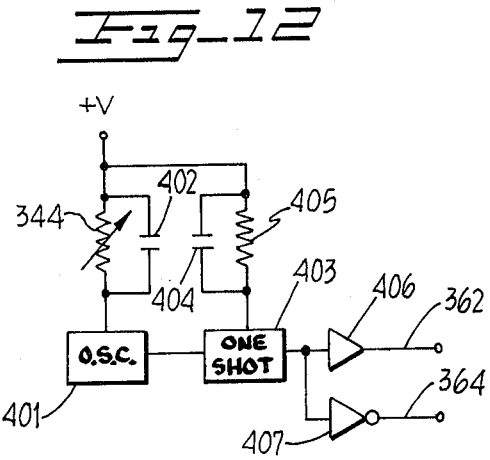
Fig_13
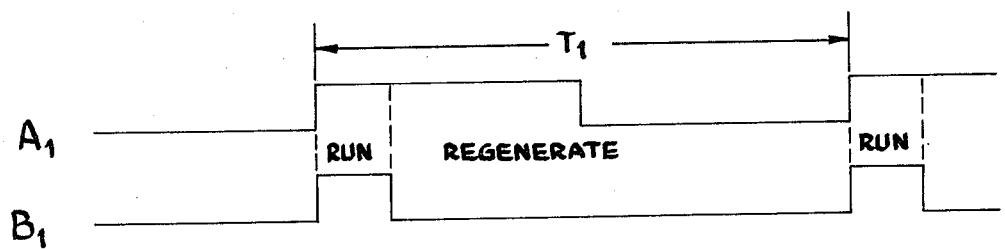
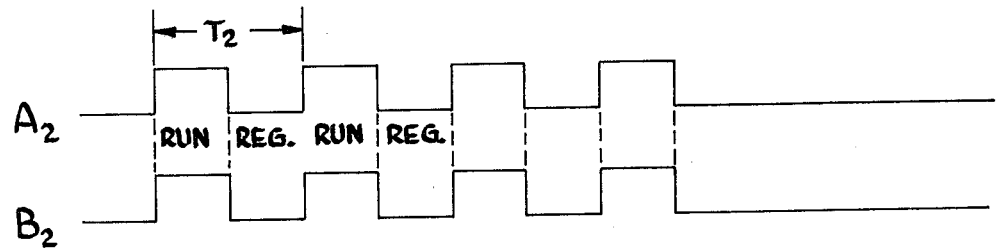
Fig_14

ELECTRIC POWER PLANT FOR MOTOR DRIVEN VEHICLES

CROSS-REFERENCE TO RELATED CASES

This application is a continuation-in-part of application Ser. No. 347,103 filed Apr. 2, 1973 abandoned, which is a continuation-in-part of application Ser. No. 157,203, filed June 28, 1971, now abandoned.

This invention relates to a new and improved battery operated electric power plant for motor driven vehicles and in particular to a new electric motor/generator system and associated electronic circuitry for operating an electric vehicle.

The failure to develop a practical self-contained electric powered vehicle has generally been attributed to limitations in the battery power packs and to the efficiencies obtainable with conventional electric motors. The present invention, however, is based on a completely new concept in electric power plants for motor vehicles which permits realization of a practical electric motor driven vehicle using conventional storage batteries or any other rechargeable batteries.

The invention contemplates, according to one of its broader concepts, a motive source for electric powered vehicles comprising in combination motor means for driving the vehicle, storage battery means, generator means for recharging the battery, switching means for alternating operations of the electric motor means and generator means at a cyclic rate while the vehicle is in motion, and throttle means for varying the relative duration of the operation of the electric motor means and generator means during each cycle, according to the power demands on the electric motor.

In one form the invention contemplates providing motor phase electrical circuitry for connecting the storage battery means and electric motor means for moving the vehicle during a motor phase of each cycle, and generator phase electrical circuitry for connecting the storage battery means and generator means for recharging the storage battery during a generator phase of each cycle. Cyclic switching means are provided for alternately connecting the motor phase electrical circuitry and the generator phase electrical circuitry for operation of the electric power plant in a motor phase and generator phase during each cycle. The switching circuitry is coupled to vary the relative duration of the motor phase and generator phase of each cycle according to the power demand on the electric motor.

In one of the illustrated embodiments of the invention, the cyclic switching arrangement is provided by a first electronic switch in the motor phase circuitry, a second electronic switch in the generator phase circuitry, and first and second pulse generators for providing first and second pulse trains for respectively triggering the gates of first and second electronic switches for conducting. The first switch has a current capacity exceeding that of the second switch. A throttle arrangement is provided for varying the frequency of the first and second pulse trains inversely with respect to each other according to the power demand on the electric motor, and the motor phase electric circuitry and generator phase electric circuitry are coupled so that when one electric switch is conducting the other is not conducting and so that the durations of the motor phase and the generator phase are respectively proportional to the frequencies of the first and second pulse trains.

In this embodiment of the invention coupling between the motor phase circuitry and generator phase circuitry is afforded by an AC capacitor connected across the respective outputs of the first and second electronic switches. A feature and advantage of this arrangement is that when the first electronic switch is conducting, shutting of the second switch and delivering battery current to the motor coils, back emf induced in the generator excitor coils charges the AC capacitor. When the charge on the AC capacitor reaches a predetermined level it shuts off the first electronic switch when the next gate pulse permits the second electronic switch to become conducting so that the system operates in a generator phase. At the same time, however, the AC capacitor discharges reaching a predetermined lower level at which the first electronic switch can again conduct at its next gate pulse and the cycle is repeated. The relative duration of the motor phase and generator phase during each cycle are furthermore proportional to the frequencies of the first and second pulse trains at the gates of the two switches.

The invention also contemplates a throttle arrangement which in one embodiment is formed by first and second pulse generators formed by first and second uni-junction transistor circuits for generating the first and second pulse trains respectively. First and second variable resistors are connected across the two pulse generating circuits for varying frequencies of the two pulse trains and the variable resistances are coupled according to the throttle arrangement for simultaneous variation of the resistances in opposite directions so that the frequencies of the pulse trains vary inversely upon operation of the throttle.

According to another aspect of the invention a unique motor/generator unit operative both for driving the vehicle and for charging the storage batteries is provided. In one embodiment of the invention, the motor/generator unit is formed with a stationary motor housing, a series of motor field coils arranged around the housing, an armature mounted for rotation within the motor housing, and armature coils arranged on the armature. Also mounted around the stationary motor housing in addition to the motor field coils are a series of generator exciter coils and a series of generator field coils. A brush arrangement provides electrical contact between the armature coils and between the motor field coils and the generator field coils. The motor coils are connected in series with the armature coils via the brushes to a first set of electrical terminals to which current is applied during the motor phase. The generator exciter coils are connected to a second set of terminals to which current is applied during the generator phase. The generator field coils are coupled across the armature coils at the first set of terminal and brushes and are operative to step up the voltage induced in the armature coil during the generator phase and drive current from the first set of terminals to the storage batteries. A feature and advantage of this arrangement is that when current is applied to the armature coils and motor coils at the first set of electric terminals, a back emf appears across the second set of terminals connected to the generator exciter coils which back emf is utilized in the switching function. When current is applied to the second set of terminals an emf appears across the first set of terminals for driving current back into the storage batteries to recharge the batteries.

Another feature of the electric motor/generator system is the brush contact ring having four electrical contact members spaced ninety degrees apart around the ring. The input at the first set of electrical terminals to which current is applied during the motor phase is connected to two adjacent electrical contact members of the ring while the motor field coils are connected to a third electrical contact for series connection with the armature coils via the brush contact members. Current supplied to the electric motor/generator during the motor phase is, therefore, concentrated in the armature coils toward one side of the ring. In this embodiment of the invention the generator field coils are connected across the first and fourth electrical contact members of the ring for parallel electrical contact across the armature coils. An advantage of this arrangement is that the generator field coils function to facilitate driving current from the armature coil back to the storage battery for recharging.

Another feature of this embodiment of the invention is that the ring is shiftable between two positions, one position for use in driving the electric motor/generator in one direction, and the other position for use in driving the electric motor/generator in the opposite direction. An electromechanical switch is provided for simultaneously shifting the position of the brush means for reversing the direction of drive of the electric motor/generator while reversing the polarity of current supplied to the generator exciter coils.

Another object of this invention is to provide an improved electronic circuit operable to control one or more vehicle-mounted dynamoelectric devices capable of operation in a motor phase and a generator phase during a first mode termed RUN-REGENERATE to power the vehicle and at least partially replenish an associated battery pack during vehicle operation and to recharge the battery pack from an alternating current source during an alternate made termed CHARGE when the vehicle is stationary. The circuit includes an oscillator whose frequency is controlled by a variable resistance mechanically coupled to the vehicle throttle, and a one shot circuit driven by the oscillator output and having a fixed period for generating oppositely-phased control signals for controlling the operation of a pair of electronic switching elements. The first switching element, preferably a transistor, controls the application of D.C. voltage from the battery pack to the armatures and coils of the dynamoelectric devices during the RUN-REGENERATE mode; the second switching element, preferably an SCR, controls the application of a stepped-down voltage from the battery pack to the coils of the dynamoelectric devices during the RUN-REGENERATE mode. During the CHARGE mode, the first and second switching elements control the application of a rectified D.C. voltage from a diode bridge coupled to an external power source and the stepped-down voltage, respectively, to the battery pack to provide pulsed recharging of the battery pack.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a block diagram of the battery operated electric power plant for motor driven vehicles.

FIG. 2 is a detailed diagrammatic view of the motor phase and generator phase electrical switching circuitry.

FIG. 3 is a schematic diagram of the throttle control and pulse generator which generates a pair of pulse trains having frequencies varying inversely with respect to each other according to the throttle position.

FIG. 4 is a plan view, FIG. 5 a side, cross-sectional view, FIG. 6 an end cross-sectional view, and FIG. 7 a bottom fragmentary view of the electro-mechanical direction switch or control mechanism.

FIG. 7a is a schematic diagram of the upper and lower levels of the electro-mechanical control switch.

FIG. 8 is a diagrammatic plan view in cross-section of the electric motor/generator unit with armature removed.

FIG. 9 is a diagrammatic plan view of the armature showing the armature windings while FIG. 10 is a detailed diagrammatic representation of the cross or lap windings of the armature coils.

FIG. 11 is a schematic diagram of an alternate embodiment of the invention for controlling one or more dynamoelectric devices mounted on a vehicle and capable of operating in a run-regenerate mode or in a charging mode;

FIG. 12 is a circuit diagram of battery pack 301 of the FIG. 11 embodiment;

FIG. 13 is a block diagram of controller unit 342 of the FIG. 11 embodiment;

FIG. 14 is a waveform diagram illustrating the operation of controller unit 342;

DESCRIPTION OF THE PREFERRED EMBODIMENTS

Figure 15:
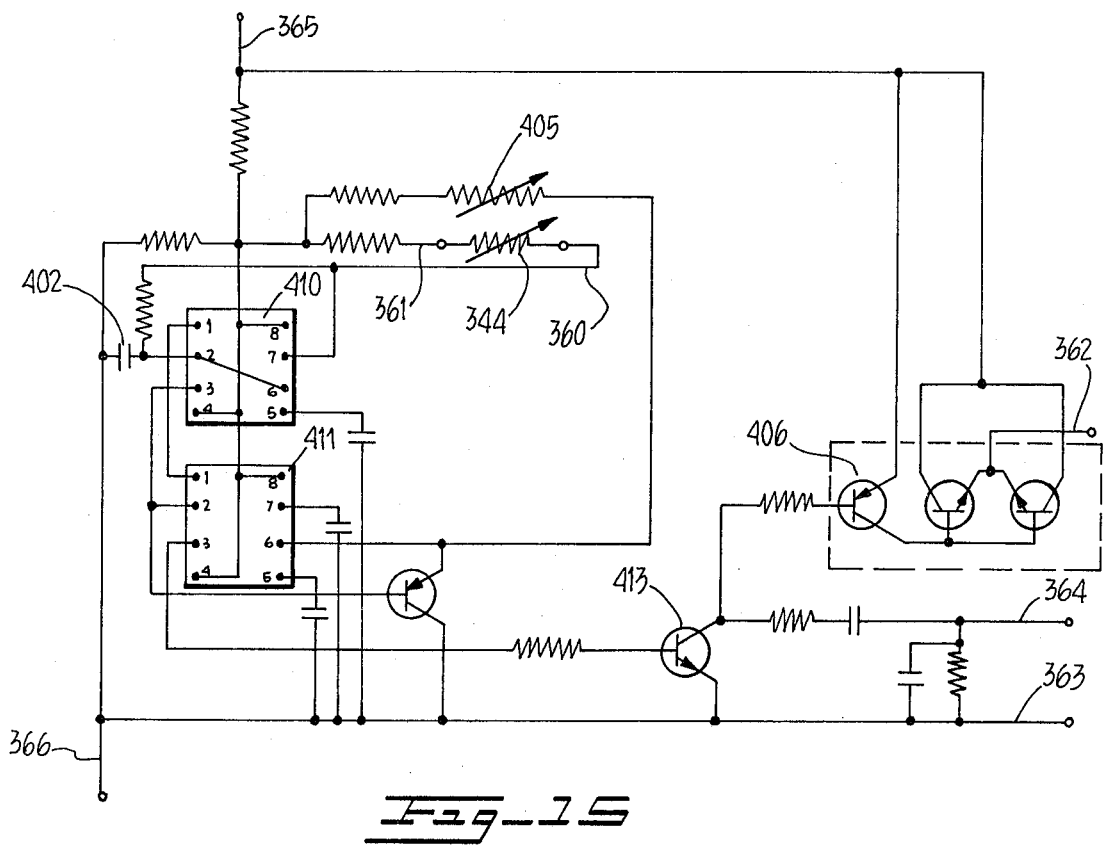
FIG. 15 is a circuit diagram showing a preferred embodiment of controller unit 342.

A general block diagram of the self-contained electric power plant for motor driven vehicles is shown in FIG. 1. The major components of the system include a pair of motor/generator units 11 and 12, storage batteries 13, the motor phase electrical circuitry 14 including electronic switch 15, the generator phase electrical circuitry 16 including electronic switch 17, AC capacitor 18 connected across the output sides of switches 15 and 17, throttle control 20, and the logic control and pulse generator unit 22. An electro-mechanical direction control mechanism or switch 23 permits reversing the direction of the motor/generator units 11 and 12 by mechanically shifting the respective brushes and reversing the polarities of the electrical connections to the units 11 and 12. The brake logic 25, actuated by the brake pedal, controls the throttle exciter balance and pulse units to hold the motor/generator units 11 and 12 in the generator phase as hereinafter described. Current monitor 26 senses current to the motor field coils during the motor phase and exciter balance 27 protects the electronic switch 17 during the generator phase. Master switch 30 is provided for cutting current to the motor/generator units. Ammeter 31 monitors current running to the motor field coils during the motor phase while ammeter 32 monitors current returning to the storage batteries during the generator phase.

In operation of the system, electronic switches 15 and 17 formed by silicon controlled rectifiers alternately switch on and off providing a motor and generator phase during each cycle. The SCRs 15 and 17 are rendered conducting by pulses provided to the gates of the respective SCRs on paired lines 33 and 34 and 44 and 45 respectively from the pulse generator unit 22. The frequencies of the respective pulse trains on paired lines 33 and 34 and 44 and 45 vary inversely with respect to each other according to the position of the throttle control unit 20. As hereinafter described, the relative durations of the motor phase and generator phase during each cycle are proportional respectively to the frequencies of the two pulse trains on paired lines 33 and 34 and 44 and 45. Thus, with a relatively high frequency pulse train on lines 33 and 34 and with a relatively low frequency pulse train on lines 44 and 45 the motor phase dominates each cycle and power is provided for accelerating and driving the vehicle. With the high frequency pulse train on lines 44 and 45 and the relatively low frequency pulse train on lines 33 and 34 the generator phase predominates during each cycle as, for example, when the vehicle is coasting downhill or slowing down.

When SCR 15 is conducting, current is directed from the batteries 13 to terminal 35 of motor 12 where it passes through the armature coils, brushes and motor field coils so that the motor/generator unit functions as a motor. Current then passes in series from terminal 36 of motor 12 to terminal 37 of motor 11 where again it passes in series through the armature coils, brushes, and motor field coils and from terminal 38 back to the batteries on line 39. Motor/generator units 11 and 12 are thus connected in series. During the generator phase SCR 17 is conducting and SCR 15 switches off so that current is passed to the generator exciter coils of motor 12 (or 11 depending upon direction of drive) through terminal 40 via the electromechanical direction control mechanism 23. After passing through the generator exciter coils the current passes from terminal 41 to terminal 42 of the motor 11 where it passes in series through the generator exciter coils, out terminal 43, and back to the battery 13 via the electro-mechanical direction switch 23. Alternatively, the leads to the generator exciter coils of motor generator units 11 and 12 from the electro-mechanical direction switch 23 can be coupled so that current supplied from battery 13 is supplied in parallel to the generator exciter coils during the generator phase. This is accomplished by the connections of the lead wires to the various terminals of the electromechanical direction switch 23 which is described in detail hereinafter. At the same time however, the motor field coils and armature coils of the respective motor generator units 11 and 12 are still in series so that during the generator phase current continues to be generated in series by the two motor generator units for return to the battery through line 92, (FIG. 2) diode 93 and the frame 78 which provides the ground side to the battery 13. The common ground side 78 is connected to the positive side of battery 13 in this example although the circuitry could obviously be arranged with reversed polarity.

SCR 15 has a current carrying capacity at least several times greater than SCR 17 so that it will ordinarily shut off SCR 17 when conducting. During the motor phase, when SCR 15 is conducting battery current to the motor field coils of motor/generator units 11 and 12, back emf is generated in the generator exciter coils charging AC capacitor 18 to its fullest capacity in the other direction. The next pulse in the pulse train on line 44 from pulse generator unit 22 switches on SCR 17 which in combination with the charged AC capacitor shuts off SCR 15 and the generator phase is initiated and current passes to the generator exciter coils. The emf generated in the armature coils by motion of the vehicle drives current back from the motor through terminals 37 and 35, respectively, to the battery for recharging. When SCR 17 becomes conducting, however, capacitor 18 discharges to ground permitting the next pulse on line 33 to switch on SCR 15 which upon becoming conducting switches off SCR 17 as heretofore described. The cycles continue thereafter.

SCR 15 has a current carrying capacity at least several times greater than SCR 17 so that during the motor phase when SCR 15 becomes conducting the predominant battery current passes SCR 15. SCR 15 and the pre-existing potential on capacitor 18 effectively short out SCR 17 so that the current passing through SCR 17 falls below the holding current of the SCR 17, and it shuts off becoming non-conducting. The battery current thereafter passing through SCR 15 to the motor field coils of the motor generator units 11 and 12 generates a back emf in the generator exciter coils which is transmitted via the electromechanical direction control unit and line 84 (FIG. 2) through solenoid 83 and increases the charge potential on capacitor 18. After the charge potential on capacitor 18 has reached a predetermined level, the next pulse at the gate of SCR 17 renders SCR 17 conducting and the combination of the charge potential on capacitor 18 and the conducting state of SCR 17 effectively short out SCR 15 so that the current passing through SCR 15 falls below the holding current of the SCR and it becomes nonconducting. Thereafter the generator phase proceeds during which current is conducted through SCR 17 to the generator exciter coils and the resulting emf generated in the armature coils of the rotating coils of the rotating armature drives the current back out from the motor generator units through line 92 and diode 93 to the motor housing 78 which forms the ground connection to the positive side of battery 13. The current generating circuit is completed by line 39 between the battery and the motor generator units. In other words when SCR 17 next becomes conducting the charge potential developed on capacitor 18 by the back emf provides a sufficient voltage difference between the capacitor and motor housing 78 to shut off SCR 15. In shutting off SCR 15 a portion of the charge potential on capacitor 18 is dissipated so that the system is ready to undergo another cycle with the next pulse at gate of SCR 15. The rate of switching and the relative durations of the motor and generator phases in each cycle are dependent upon the respective frequencies of the pulses applied to the gates of the SCR's. Thus, a lower frequency of pulses at the gate of SCR 15 means a longer delay before the motor phase is again initiated so that the generator phase predominates, however, a higher frequency to the pulse gate means a shorter duration before the motor phase is again initiated and the motor phase predominates.

The throttle control and pulse generators and associated circuitry are shown in the schematic diagram of FIG. 3. The two pulse generators for controlling SCR's 15 and 17 are provided by two uni-junction transistor oscillator circuits 50 and 51, each including a uni-junction transistor 52 and 53 respectively and associated circuitry. The output from unijunction transistor oscillator circuit 50 is obtained across diode bridge 54 at terminals 33 and 34 and the bridge is coupled to the output of oscillator 50 by transformer 57.

The output from oscillator 51 is obtained from diode bridge 58 at terminals 44 and 45 and diode bridge 58 is coupled to the output of the oscillator circuit by transformer 63.

By this arrangement the respective outputs of the two oscillator circuits comprise effectively square wave pulse trains. The frequencies of the respective pulse trains are varied by variable resistors connected across the inputs to the uni-junction transistors 50 and 51 and provide the throttle controls. Thus, variable resistors 64 and 65 are connected across the inputs to uni-junction transistors 52 and 53 respectively. The resistances of the variable resistors 64 and 65 respectively are varied by a throttle lever arm 66 which may be, for example, a foot pedal. The variable resistors are coupled to the level arm 66 so that the resistances of resistors 64 and 65 vary simultaneously in opposite directions and therefore inversely with respect to each other. Thus, as the resistance of the resistor 64 increases, the resistance of the resistor 65 decreases. Variation in resistance across the input to the uni-junction transistors varies the frequency of the oscillator outputs, and the frequencies of the pulse trains appearing at diode gates 54 and 58 respectively therefore vary inversely with operation of the throttle lever control 66. The various components of the circuitry have been selected to provide an oscillator pulse train output frequency in the range of from zero to 400 cycles per second and the resistances 64 and 65 have been selected so that the output frequencies vary approximately from 30 to 400 cycles per second over the range of the two resistances. Thus, as the output pulse train at diode bridge 54 varies from 30 to 400 cycles per second with variation of variable resistance 64, the output pulse train at diode bridge 58 varies from 400 cycles per second to 30 cycles per second with the variation of resistor 65. The two pulse trains are applied to the gates of the electronic switches in the motor phase and generator phase circuitry which is described in more detail with reference to FIG. 2.

The output from the terminals across one of the diode bridges is applied to the gate of SCR 15 on lines 33 and 34. SCR 15 forms an electronic switch controlling the flow of current to the motor coils of the motor/generator unit for operation of the unit in a motor phase for driving the vehicle. One side of the SCR 15 is connected to the plus side of the battery by the chassis 78, in turn connected to the battery so that the common side or ground of the circuitry is positive. The circuitry can of course be arranged with reversed polarities. The other side of SCR 15 is connected by a line 70 to diode 71 which passes current to terminal 72, through solenoid switch 73 to line 74 which is connected to the plus terminal 35 of the motor/generator unit 12 for actuating the armature and motor field coils for functioning during the motor phase. The presence of current passing through SCR 15 and diode 71 to solenoid 73 is sensed by a nichrome wire shunt coil 75 which functions to pass some of the current to operate the solenoid 73. Thus, during the motor phase when SCR 15 is conducting, current passes from the storage batteries by means of the common chassis 78 through SCR 15 and diode 71 to the motor field coils.

The output from the terminals across the second bridge from the oscillator 51 is connected to the gate of the second SCR 17 by lines 44 and 45. SCR 17 is smaller than SCR 15 and functions to conduct current from the battery by means of the common chassis 78 connected at one side to the SCR 17 to the generator exciter coils via line 82 and exciter solenoid 83. Line 84 thereafter leads to be electro-mechanical direction control mechanism 23 and generator exciter coils of the motor/generator units as hereinafter described.

SCR 85 provides a reverse route back to the battery 13 for charging the battery with current driven by the back emf in excess of that required to charge the capacitor 18. SCR 85 is triggered by pulses from the pulse generator unit tapped from transformer 63 (FIG. 3) and becomes conducting only when the back emf exceeds the battery voltage. The pulses for switching SCR 85 are derived from the diode bridge 46 which is coupled to the pulse oscillator 51 by transformer 63 and the output across diode bridge 46 is connected to the gate of SCR 85 along the lines 47 and 48. Thus, the frequency of the pulses applied at the gate of SCR 85 follow the frequency of the pulses applied to the gate of SCR 17. SCR 85 also functions as the exciter balance 27 as shown in FIG. 1 functioning as a balance for the SCR switches 15 and 17 in the motor phase and generator phase electrical circuitry. Resistor 86 connected across SCR 17 and 85 is a high resistance which protects the electronic switches from spurious spike voltages. Capacitor 87 is also connected across the SCR switches 17 and 85 functions to balance and protect the gating circuits of SCR 17 and 85 and is part of the exciter balance 27 indicated in FIG. 1.

It should be noted that with respect to the motor phase operation of the system a second solenoid 90 is provided which, when actuated, provides a direct route for current from the battery to the armature and motor field coils for functioning of the motor/generator unit in the motor phase. The solenoid 90 can be actuated by, for example, a "passing gear" switch under the control of the operator. Exciter solenoid 83 is normally conducting and becomes non-conducting only when actuated. When actuated in conjunction with the "passing gear" switch it cuts out the generator phase circuitry. Solenoid 83 also cuts out the generator circuitry when the vehicle is braked to a complete stop.

Connected across the outputs of the SCRs 15 and 17 is an AC capacitor 18 which functions in the cyclic switching operation of the SCRs. Thus, with SCR 15 initially conducting current to the armature and motor field coils of the motor/generator units, a back emf generated in the generator exciter coils return along line 84 by exciter solenoid 83 and line 82 charging the capacitor 18 in one direction. During the motor phase when SCR 15 is conducting, SCR 17 is shut off as herebefore described. At the same time AC capacitor 18 is charging and when the charge reaches a predetermined level, SCR 15 is shut off with the next pulse at the gate of SCR 17, SCR 17 and capacitor 18 effectively shorting out SCR 15. When SCR 17 becomes conducting, current is conducted along line 82, reverse solenoid 83 and line 84 to the generator exciter coils heretofore described. With the motor/generator units functioning in the generator phase, current is driven back from the armature and motor field coils through line 74, solenoid 73, line 92 and diode 93 to the battery for recharging the storage batteries. Current is prevented from passing back to SCR 15 by the diode 71. As soon as SCR 17 becomes conducting, the AC capacitor 18 discharges and when the charge level falls below a predetermined level, SCR 15 can again become conducting at the next pulse to the gate on lines 33 and 34. When SCR 15 becomes conducting again during the motor phase SCR 17 is shut off as heretofore described. The cycle is thereafter repeated continually with only variation in the relative duration of the motor phase and generator phase of each cycle according to the frequency of the pulses applied to the respective gates of SCRs 15 and 17.

Control of the relative duration of the motor phase and generator phase during each switching cycle of the system by the frequencies of the pulse trains at the gates of the two electronic switches can be understood as follows. With SCR 15 initially conducting current to the armature and motor field coils of the motor/generator unit, SCR 17 becomes non-conducting. SCR 15 continues to conduct during the period of charging of AC capacitor 18 by the back emf generated in the generator exciter coils until the charge reaches a predetermined level which shuts off SCR 15 after the next pulse to SCR 17. SCR 17 then becomes conducting at the next pulse of the pulse train applied to the gate at lines 44 and 45. If the frequency of the pulse train applied to the gate of SCR 17 is a relatively high frequency, SCR 17 will on the average switch to the conducting state faster than at a lower frequency pulse train. In particular, the average waiting period will be one half the period of the pulse train applied to terminals 44 and 45. When SCR 17 becomes conducting, current is supplied through lines 82 and 84 to the generator exciter coils of the motor/generator units so that they function in the generator phase. SCR 17 continues to conduct during the period that AC capacitor 18 discharges through the common chassis ground connection 78 which is on the positive side of the battery. When the charge on capacitor 18 falls below a predetermined level, SCR 15 can again become conducting at the next pulse of the pulse train applied to lines 33 and 34 of the gate for SCR 15. If the frequency of the pulse train is a relatively low frequency, the average waiting period before SCR 15 is switched to the conducting state is longer than for a higher frequency pulse train. In particular, the waiting period on the average will be one half period of the pulse train. During this waiting period SCR 17 continues to conduct current maintaining the generator phase.

It is thus apparent that the durations of the motor phase and the generator phase during each switching cycle are related to the time constant of capacitor 18, the respective periods of the pulse trains applied to the respective gates of SCRs 15 and 17, the characteristics of the SCRs, and other circuit factors including the balancing capacitor 87. The duration of the generator phase on the average is related to the sum of the time constant of AC capacitor 18 and one half the period of the pulse train applied to the electronic switch in the motor phase circuitry. On the other hand, the duration of the motor phase is related to the sum of the time constant of AC capacitor 18 and one half the period of the pulse train applied to the gate of the electronic switch in the generator phase circuitry.

The motor/generator unit to which current is supplied by the motor phase and generator phase electrical circuitry is shown diagrammatically in FIG. 8. The motor/generator unit includes a stationary housing 100 in which various functional coils are housed. During the motor phase, when the motor/generator unit 12 is functioning as a motor to drive a vehicle, current is supplied to terminal 35 which forms the positive motor terminal. Current passes through the armature coils and motor field coils as hereinafter described and passes from terminal 36 to the positive motor terminal of the second motor/generator unit so that the two units are coupled in series.

Mounted within the housing 100 is a ring 103 on which four electrical contact brushes 104, 105, 106, and 107 are mounted for providing electrical contact between the armature coils of the armature not shown in FIG. 8 and specified coils mounted around the housing 100. The armature is shown separately in FIG. 9. Electrical contact brushes 104 through 107 are spaced 90° apart around the ring 103 and the ring is shiftable between two positions spaced 90° apart for reversing the direction of drive of the motor. Shifting of the ring is accomplished by means of a mechanical rod or lever 108 coupled to the electro-mechanical direction control mechanism hereinafter described. Current from the motor phase electrical circuitry applied to positive terminal 35 is directly coupled to the armature brushes 104 and 105 via lines 110 and 111. Current passes through the armature coils hereinafter described with reference to FIG. 9 to brush 106 which is coupled by line 112 to the motor field coils 113 spaced around the housing 100. After passing through all the motor field coils 133 which include four quadrant coils 113a, current passes out terminal 36 to the second motor/generator unit where it passes in series in the same manner as described. Because the incoming current is applied to two adjacent brushes 104 and 105 spaced 90° apart, current passing through the armature coils is concentrated toward one side of the armature.

During this motor phase, a back emf is generated in the generator exciter coils 115, spaced around the housing 100 and electrically isolated from the other coils, which appears across terminals 40 and 41 to which the generator exciter coils are coupled. The back emf drives current through terminals 40 and 41 for charging the AC capacitor 18 in the generator phase electrical circuitry during the motor phase.

During the generator phase, current from the batteries is applied to a positive terminal 40 and current passes through the generator exciter coils out through terminal 41 to the positive generator terminal 42 of the second motor/generator unit and out terminal 43 so that the two units are again coupled in series. However, coupling is mediated by the electro-mechanical direction control mechanism as hereinafter described for reversing the polarity of the generator terminals when the ring 103 is shifted for reversing the direction of drive motion. Current supplied to the generator exciter coils excites the rotating armature coils inducing emfs which drive currents back out through the brushes and terminals 35 and 38 to the batteries for recharging the storage batteries.

In order to facilitate the generator operation, another set of coils referred to herein as the generator field coils 120 are provided wound around the quadrant motor coils spaced around the housing and coupled at one end to the positive terminal 35 by means of line 121 and at the other end to brush 107 by means of line 122. The generator field coils are thus effectively coupled across the armature coils by means of brushes 104 and 105 on one side and brush 107 on the other side. During the generator phase, the additional emf induced in the generator field coils functions to drive current from the armature coils out terminal 35 to the storage batteries. Thus, the generator field coils 120 are coupled across the armature coils and function as transformers to provide additional electromotive force for driving current for recharging the batteries. Because the brushes 104, 105 and 107 function during this operation, the current is again concentrated in the armature coils toward one side of the ring 103, but in this case a different sector of the ring than that involved during the motor phase.

A diagrammatic plan view of the armature removed from the motor housing is shown in FIG. 9. The armature 130 includes an armature support 131 on which the armature coils 132 are lap-wound or cross-wound with respect to the commutators 133. As shown diagrammatically and for illustrative purposes, commutator 144 would be connected via coil 145 to commutator 146. Commutator 146 is, in turn, coupled by way of coil 147 to commutator 148. Commutator 148 in its own turn is coupled by way of coil 150 to commutator 151 and commutator 151 is coupled via coil 152 to commutator 153, and so on. For purposes of clarity the electrical connections of the actual commutators 133 are shown removed from the ring of commutators 133. A cross-winding arrangement is shown diagrammatically in further detail in FIG. 10 with corresponding commutator elements correspondingly labeled.

The electro-mechanical direction control mechanism or switch is illustrated in FIGS. 4 through 7 and functions to reverse the direction of drive of the motor and hence of the vehicle with which it is used. This direction control mechanism functions simultaneously to mechanically rotate or shift the position of the brush rings of the two motor/generator units and to reverse the polarity of the generator terminals of the two units by reversing the direction of current in the generator exciter coils. The electro-mechanical switch or direction control mechanism is generally formed by a stationary block 150 and a cross yoke or cross bar 155 which rotates relative to the block 150. The stationary block 150 includes an upper plate 150a and a lower plate 150b while the yoke 155 includes an upper cross bar 155a and a lower bar 155b.

The upper plate 150a of block 150 is provided with four electrical contacts 151, 152, 153 and 154 for making electrical contact with the upper cross bar 155a of yoke 155. Electrical contact 152 is connected to electrical lead wire 160 and electrical contact 154 is connected to electrical lead wire 161. One side of the yoke 155 is connected to a mechanical lever arm or rod 162 while the other side of the yoke is connected to mechanical lever arm or rod 163. Rods 162 and 163 are connected respectively to the brush rings of the two motor/generator units for rotating and shifting the position of the brushes when the direction of motion or drive is to be reversed. The arm 164 of cross bar 155a provides an electrical conduit between the contacts 151 and 153 on the one hand and 152 and 154 on the other hand depending upon the rotational position of the yoke. A diode 165 connected to the electrical line of arm 164 permits passage of current in only one direction. Thus, by rotation of the yoke the brush rings of the two electric motor/generator units are simultaneously shifted and electrical connection is made between contacts 151 and 153 or between 152 and 154 depending upon the desired direction of current.

At the same time, yoke 155 is provided with a lower bar 155b and block 150 is provided with a lower plate 150b. Plate 150b is provided with two sets of four electrical contacts, an inner set 170, 171, 172 and 173 and an outer set of electrical contacts 174, 175, 176 and 177. Contacts 172 and 173 are electrically tied by bar 178 while electrical contacts 171 and 170 are tied by bar 180. Electrical contacts 175 and 176 are tied by bar 181 while electrical contacts 174 and 177 are electrically tied by bar 182. The lower bar 155b of yoke 155 formed with an electrically conducting portion on each side of the rotation axis 190 and rotates between two extreme positions providing electrical connection between two pairs of contacts simultaneously. Thus, in one rotational position contacts 175 and 171 on the one hand and 173 and 177 on the other are in electrical connection across bar 155b while in the opposite rotational position electrical contacts 174 and 170 on the one side and 172 and 176 on the other are in electrical contact across the bar. Four electrical leads 185, 186, 187, and 188 are provided from selective ones of the electrical contacts on plate 150b to the respective generator terminals for the generator exciter coils of the electric motor/generator units for reversing the polarity of the terminals when the direction of drive is reversed.

The functioning of the upper and lower portion of the electro-mechanical direction control mechanism in reversing the polarity of the generator exciter coils is shown schematically in FIG. 7A with elements corresponding to FIGS. 4-7 numbered the same. Lower crossbar 155b forms two separate conducting sections electrically isolated on each side of the central axis 190 and rotates between two positions indicated by the solid and dotted lines. In both positions the line polarities at terminals 195 (connected to line 84) and 196 remain the same while the polarities of the generator exciter coils 197 and 198 are reversed by rotations of the crossbar 155b 90°.

The lower portion of the electro-mechanical control mechanism comprising the eight contacts 170 through 177, and the crossbar 155b having two electrically isolated conductive elements, permits reversal of the polarity of the generator exciter coils indicated in FIG. 7A by numerals 115 and 115a for motors 12 and 11 respectively. The four contacts 151-154 and diode 165 on the upper level of the electro-mechanical control switch permit reversal of direction of the current and only one-way passage of current in either direction depending upon the position of the diode. Thus, with diode 165 making electrical contact between contacts 152 and 154, current can pass only in the direction from contact 152 to contact 154. On the other hand, with the diode rotating clockwise 90°, electrical contact is established across contacts 151 and 153 with current passage in the direction from contact 153 to 151 only. Contacts 151 and 152 are strapped by electrical connection 197 while contacts 153 and 154 are strapped by electrical connection 198 and the two sides of the upper switch indicated by terminals 200 and 201 are connected into the electrical circuitry of the lower switching elements of the electro-mechanical control mechanism. Thus, as shown in FIG. 7A, one side of the upper switch, represented by terminal 200, is connected to the strap 181 while the other side of the upper switch, represented by terminal 201, is connected to the line leading to one of the generator exciter coils.

While the current flow into the lower switching mechanism through line 195 is always the same, and while the current flow out of the lower switching mechanism along line 196 is always the same, the current reverse direction along the internal electrical connections between the elements 170 through 177 and generator exciter coils depending upon the rotational position of the lower crossbar 155b. It is in this internal circuitry between the lower elements that the upper switching mechanism is connected, and the diode 165 rotates simultaneously with the lower crossbar 155b. Thus, while the lower crossbar 155b reverses the polarity of the generator exciter coils, the diode 165 at the upper level of the electro-mechanical control mechanism permits current flow only in one direction namely the direction corresponding to the selected polarity for the generator exciter coils.

FIGS. 11-16 illustrate an alternate embodiment of the invention having two modes of operation: RUN-REGENERATE and CHARGE. The former is employed to provide motive power to operate the vehicle; the latter is employed when the vehicle is stationary to replenish the vehicle batteries. With reference to FIG. 12, a battery pack 301 includes a plurality of conventional rechargeable storage batteries, a first output terminal 302 coupled to ground potential via an ignition switch 303, and second, third and fourth output terminals 304-306. Terminal 304 is coupled to a fixed terminal of a switch 311 described below. Terminal 305 is coupled to one side of a voltage dropping unit 307, to a common terminal 308 of a manually actuatable four-position switch 309 and to a terminal 310 of a manually actuatable triple pole double throw MODE switch 311. MODE switch 311 has two positions: a CHARGE position (illustrated) and a RUN-REGENERATE position (not illustrated). Terminal 306 is coupled to an alternate fixed terminal switch 311 for a purpose to be described.

Four position switch 309 has four fixed contacts 312, 313, 314 and 315 which are coupled to individual 24 volt relays in battery pack 301 to provide a potential on terminal 304 of 24, 48, 72, and 96 volts, respectively, when contacted by blade 316 of switch 309.

FIG. 12 illustrates one embodiment of battery pack 301 in detail. As shown in this Fig., a first pair of batteries 318 is serially connected between terminal 302 and terminal 305; a second pair of batteries 319 is serially connected between terminal 305 and an internal terminal 320; a third pair of batteries 321 is serially connected between terminal 320 and an internal terminal 322, and a fourth pair of batteries 323 is serially connected between terminal 322 and terminal 304 via the contacts of a conventional normally opened relay 325. Terminals 305, 320, and 322 are also connected to terminal 304 via conventional normally opened relays 326, 327 and 328, respectively. The actuating coils of relays 325-328 are all connected at one side to common ground terminal 302. The other end of the actuating coils of relays 325-328 are coupled to fixed terminals 312-315 as shown.

In operation, when blade 316 of switch 319 is placed in contact with terminal 312, relay 326 is actuated thereby coupling terminal 305 to output terminal 304 and furnishing 24 volts D.C. to the latter element. Similarly, when blade 316 is placed in contact with fixed terminals 313, 314 or 315, terminals 320, 322 and the positive terminal of battery terminal 323, respectively, are coupled to terminal 304, thereby furnishing 48, 72, or 96 volts to terminal 304. It should be noted that relays 325-328 are normally open, so that only one of the four relays is actuated for a given position of switch blade 316. It should further be noted that the arrangement of FIG. 12 is illustrative only, and that other equivalent configurations will occur to those skilled in the art.

Referring back to FIG. 11, terminal 304 is additionally coupled to a first one of a pair of serially connected armatures 330, 332 of a pair of dynamo-electric devices having associated field coils 331, 333. Field coils 331, 333 are connected together at one end thereof, the remaining ends each being coupled in parallel to first contact terminals of a pair of solenoids 335, 337 and 336, 338, respectively. Solenoids 335-338 are controlled by the position of a forward-reverse switch 339, which comprises a double pole double throw manually actuatable switch having blades a, b coupled to a terminal of MODE switch 311. With MODE switch 311 in the RUN-REGENERATE position, when blade a of switch 339 is in the upper position illustrated, relays 335 and 338 are actuated and relays 336, 337 are deactuated (contacts open); while relays 336, 337 are actuated and relays 335, 338 are deactuated when blade a of switch 339 is in the down position (MODE switch 311 is in the run position). By this arrangement, current may be made to flow in either direction through coils 331, 333 as described more fully below.

The manner in which voltage and current are applied to armatures 330, 332 and coils 331, 333 is determined by a transistor 340 and an SCR 341 each operated in a switching mode under control of a controller unit 342 described more fully below in connection with FIGS. 13-15. Briefly described, controller unit 343 comprises an oscillator whose instantaneous frequency is a function of the valve of a resistance 344 and a one-shot circuit triggered by the output of the oscillator and having a fixed time-out period for generating oppositely phased control signals for switching transistor 340 and SCR 341. Thus, when transistor 340 is switched on, SCR 341 is switched off and vice versa. When transistor 340 is switched on, the voltage present at the collector thereof is presented to circuit terminal 345. When SCR 341 is switched on, the voltage present on the anode thereof supplied from voltage dropping unit 307 is presented to circuit terminal 345. Voltage dropping unit 307 comprises a variable resistance or the like for reducing the magnitude of the voltage provided on terminal 305 (24 volts) to a lower value. Voltage dropping unit 307 is preferably manually adjustable to enable the optimum value of the voltage presented to the anode of SCR 341 to be determined empirically.

As noted above, the frequency of the oscillator portion of controller unit 342 is controlled by the value of resistance 344. Resistance 344 comprises a potentiometer having a wiper arm 347 mechanically linked to a throttle pedal 350 so that the position of wiper arm 347 follows the position of pedal 350. Throttle pedal 350 is also mechanically linked to a pair of single pole single throw override switches 351, 352 which are used to operate relays 353 and 354, respectively, for a purpose to be described.

A solenoid 356 provides a circuit path between armature 332 and the collector of transistor 340, and is controlled by a switch 358 which is mechanically linked to a clutch pedal 359 and which is normally closed when the clutch is engaged.

FIG. 13 shows a block diagram of controller unit 342. As seen in this Fig., controller unit 342 includes an oscillator 401 whose frequency is controlled by an R-C network comprising a capacitor 402 and variable resistance 344, and a one-shot circuit 403 triggered by the output of oscillator 401, the period of one shot 403 being controlled by an R-C network comprising a capacitance 404 and a resistance 405. The output of one-shot circuit 403 is coupled via a power amplifier 406 to output conductor 362, which is coupled to the base of transistor switch 340, and also via an inverter 407 to conductor 364, which is coupled to the control electrode of SCR 341.

FIG. 14 illustrates the operation of the controller unit of FIG. 13 in two extreme cases. In this Fig., waveforms A illustrate the output of oscillator 401, while waveforms B illustrate the output of one-shot circuit 403. Waveforms A1, B1 illustrate circuit operation when oscillator 401 is operated at the low end of the frequency scale, (e.g. 200 HZ). As can be seen from a comparison of the two waveforms, the dynamoelectric device is operated as a motor (RUN mode) for a small fraction of the total period T1 and operated as a generator for the remainder of the period. Waveforms A2, B2 illustrate operation of the circuit at the high frequency end of the scale (e.g. about 1,000 HZ). As a comparison of the two waveforms shows, the dynamoelectric device is operated as a motor for approximately 50% of the period T2 and as a generator for the remaining half of this period.

FIG. 15 is a circuit diagram of the preferred embodiment of the FIG. 13 unit, with corresponding elements being designated by the same reference numerals as those employed in FIG. 13. The circuit employs a pair of conventional NE 555 integrated circuits 410, 411 interconnected to the discrete circuit elements as an oscillator and a one-shot circuit, respectively. It is noted that in this circuit, resistance 405 is variable, which permits the period provided by the one-shot circuit to be varied in order to enable optimum adjustment of the period of the one shot in an empirical manner. In addition, the function of inverter 407 is performed by a transistor 413 which also provides an input control voltage to the power amplifier 406. It is further noted that the circuit of FIG. 15 is illustrative only, and that other equivalent circuits will occur to those skilled in the art.

As noted above, the embodiment of FIGS. 11-16 is capable of two separate modes of operation: RUN-REGENERATE and CHARGE. The RUN-Regenerate mode proceeds as follows. Initially, ignition switch 303 is closed, clutch 359 is disengaged and throttle pedal 350 is in the idle position. Switches 311, 339 are thrown to the down position (not illustrated). Relays 336, 337 are actuated by 24 volts supplied via blade a of switch 311 and blade a of switch 339. Relays 370, 371 and 372 are actuated by 24 volts supplied via blade b of switch 339. The low voltage output of voltage dropping unit 307 is coupled to the anode of SCR 341. Positive voltage of 24, 48, 72 or 96 volts, depending on the selected position of blade 316 of switch 309, is supplied from terminal 304 of battery pack 301 to armature 330 and via actuated relay 370 to circuit point 385 of a four diode network 380. Operating potential is supplied to controller unit 342 via blade b of switch 311 and conductor 365 and blade c of switch 311 and lead 366, blade c being coupled to ground potential.

With enabling voltages present on the conductors 365, 366 controller unit 342 alternately switches transistor 340 and SCR 341 in the manner described above, the frequency of the oscillator portion of the control unit through 342 being at the low end of the scale with throttle pedal 350 in the idle position. Since clutch 359 is disengaged, relay 356 is unactuated so that no circuit path is completed through armatures 330, 332 and the vehicle remains stationary. When clutch 359 is engaged, clutch switch 358 closes, thereby actuating relay 356 to complete the circuit path through armatures 330, 332 and enable the dynamoelectric device comprising the elements 330-333. When transistor 340 is switched on and SCR 341 is switched off, current flows from battery pack 301 via terminal 304 through armatures 330, 332, through transistor 340, relay 336, field coils 333, 331, and relay 337 to ground, and the dynamoelectric device operates as an electric motor. When transistor 340 is switched off and SCR 341 is switched on, current flows from the battery pack 301 via 24 volt terminal 305, voltage dropping unit 307, SCR 341, relay 336, field coils 333, 331 and relay 337 to ground, and the dynamoelectric device operates as a D.C. electrical generator. The current thus generated is supplied to battery pack 301 via terminal 304. As throttle pedal 350 is depressed, the value of resistance 344 changes and in a first sense the duty cycles of transistor 340 and SCR 341 change in the manner noted above to cause acceleration of the motors and a resulting acceleration of the vehicle. Similarly, as pressure on throttle pedal 350 is relieved, the pedal is urged toward the idle position by a spring 355, the value of resistance 344 changes in the opposite sense and the duty cycles of transistor 340 and SCR 341 change in the manner noted above to cause deceleration of the motors and the vehicle. It should be noted that the dynamoelectric devices are operated in alternate RUN and REGENERATE phases over the entire range of frequencies noted below, regardless of whether the vehicle is accelerating or decelerating, unless the transistor 340 is by-passed in the manner noted hereinafter.

The embodiment of FIG. 11 is provided with a pair of switches 351, 352 for bypassing the switched transistor 340 under conditions requiring intermediate or high level power surges to the dynamoelectric device without regeneration (i.e. operation as a motor only). Switch 351 controls by-pass of transistor 340 in the intermediate range, while switch 352 controls bypass of transistor 340 in the maximum range. Throttle pedal 350 is mechanically linked to switches 351, 352 so that, when pedal 350 is fully depressed switch 352 closes to actuate relay 354, while when pedal 350 is depressed a predetermined distance, (e.g. three-quarters of the total distance) relay 353 is actuated. As will be apparent to those skilled in the art, when either relay 353 or 354 is actuated, transistor 340 is shunted and current flows through the actuated relay to circuit point 345. Resistance 390 limits the voltage to circuit terminal 345 to provide an intermediate power surge when relay 353 is actuated.

As will be apparent to those skilled in the art, the dynamo electric device may be operated in the reverse direction as a motor by simply placing contacts a, b of switch 339 in the opposite position from that described above, so that relays 335, 338 are actuated while relays 336, 337 are deactuated.

Figure 16:
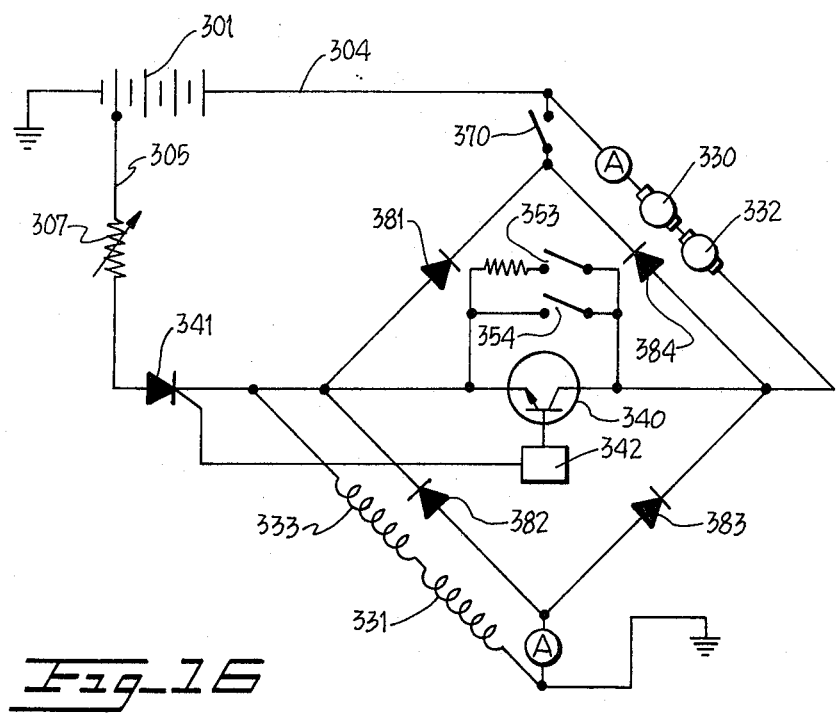
FIG. 16 is a simplified diagram of the FIG. 11 embodiment illustrating operation in the RUN-REGENERATE mode.

FIG. 16 is a simplified diagram of the FIG. 11 embodiment illustrating current paths through the various components when the circuit is operated in the RUN-REGENERATE mode. During the RUN portion of the cycle, when transistor 340 is switched on and SCR 341 is switched off, current flows from battery pack 301, thru armatures 330, 332, transistor 340, and coils 333, 331 to ground. When operated in the REGENERATE portion of the cycle, current flows from the 24 volt terminal 305 battery pack 301 via voltage dropping unit 307, SCR 341 and coils 333, 331 to ground. The current induced in armatures 330, 332 flows into battery pack 301 via terminal 304. During switching, diodes 382, 384 function in a conventional manner as "free wheeling" diodes.

With reference to FIG. 11, the CHARGE MODE of operation proceeds as follows. Initially, ignition switch 303 is closed, switch 311 is thrown to the charge position (illustrated) and circuit points 386, 388 of a diode bridge 380 are coupled via a switch 419 and an AC meter 420 to a suitable alternating current source 421, e.g. a conventional 110 volt A.C. wall outlet plug. Blade 316 of switch 309 is placed in contact with terminal 315 so that all batteries within battery pack 301 are coupled in series. Relays 425, 426 and 427 are all actuated by 24 volts supplied from battery pack 301 via terminal 305, terminal 308 of switch 309, terminal 310 and blade a of switch 311. Relay 425 couples circuit point 385 of diode bridge 380 to the collector of transistor 340; relay 426 couples circuit point 345 to the free end of field coil 331; and relay 427 couples the free end of field coil 333 to terminal 304 of battery pack 301. Relays 335-338, 353, 354, 356, and 370-372 are all in the unactuated state. A potential of 24 volts is supplied to controller unit 342 via terminals 304, 306, blades b, c, of switch 311, and conductors 365, 366 so that controller unit 342 operates switching transistor 340 and SCR 341. Accelerator pedal 350 is placed in an intermediate position, which may be specified by a conventional mechanical detent, to adjust the frequency of oscillator 401 to a suitable value. When transistor 340 is switched on and SCR 341 is off, rectified D.C. current is supplied from circuit point 385 via relay 425, transistor 340, relay 426, field coils 331, 333, and relay 427 to terminal 304 of battery pack 301. When transistor 340 is switched off and SCR 341 is switched on, no current is supplied to battery pack 301 from diode bridge 380. Thus, battery pack 301 is charged in a pulsed mode, which has been found to shorten the time required to completely recharge the batteries in battery pack 301.

As noted above, both the oscillator portion and the one-shot circuit portion of controller unit 342 are provided with variable resistance 344 and 405, respectively, to enable variation of the frequency of the oscillator and the period of the one-shot circuit to enable operation over optimum parametric ranges. In general, the preferred range of frequencies for oscillator 401 is from about 200 to about 1,000 Hz in the RUN-REGENERATE mode, while oscillator is set to a value of about 500 Hz in the CHARGE mode. The period of one-shot 403 in the preferred embodiment can be varied from about 43 microseconds to about 5.5 milliseconds. It has been found that the optimum setting for the period of one-shot circuit 403 can best be determined on an empirical basis, and for this purpose a pair of D.C. ammeters 430, 431 are provided which permit a visual comparison of the charge and discharge rates of battery pack 301 during operation in the RUN-REGENERATIVE mode.

It should be noted that the maximum value of the voltage supplied to the anode of SCR 341 is typically substantially less than the value of the potential on terminal 305 of battery pack 301. For example, with 24 volts D. C. present on terminal 305, voltage dropping unit 307 is typically adjusted to supply no more than 6 volts D. C. to the anode of SCR 341. The optimum value of this voltage is usually less than the maximum, and has been found to be about 2 volts D.C. in the preferred embodiment.

While the above provides a full and complete disclosure of the preferred embodiments of the invention, various modifications, alternate constructions and equivalents may be employed without departing from the true spirit and scope of the invention. For example, equivalent circuits having reverse polarities may be provided if required in a particular application. Therefore, the above description and illustrations should not be construed as limiting the scope of the invention which is defined by the appended claims.

What is claimed is:

1. A battery operated electric power system for a motor driven operator controlled vehicle comprising:
   electric motor means for driving the vehicle;
   electric generator means driven by motion of the vehicle for providing a battery charging voltage;
   means for alternating operating said motor means and said generator means during motion of the vehicle to define a repetititve system operating cycle having a motor portion and a generator portion; and
   means for varying the relative duration of said motor portion of said cycle and said generator portion of said cycle said varying means including power demand means controllable by said operator.

2. In a motive source for operator controlled electric powered vehicles having an electric motor means for driving the vehicle, storage battery means, and generator means for recharging the storage battery means, the improvement comprising:
   switching means for alternating operation of the electric motor means and generator means while the vehicle is in motion to define a repetitive cycle having a motor portion and a generator portion, said switching means including power demand means controllable by the vehicle operator for generating power demand signals, said switching means being operative to vary the relative duration of the operation of the electric motor means and generator means during each said cycle according to said power demand signals.

3. A battery operated electric power plant for an operator controlled motor driven vehicle comprising:
   rechargeable storage battery means;
   electric motor means driven by said storage battery means for moving the vehicle;
   generator means powered by the motion of the vehicle for recharging said storage battery means;
   motor phase electrical circuitry for connecting the storage battery means and electric motor means for moving the vehicle;
   generator phase electrical circuitry for connecting the storage battery means and generator means for recharging the storage battery; and
   cyclic switching means for alternately connecting the motor phase electrical circuitry and generator phase electrical circuitry and generator phase electrical circuitry for operation of the power plant to define a repetitive power plant cycle having a motor phase and generator phase during each cycle, said switching means including power demand means controllable by the vehicle operator for generating power demand signals, said switching means being operative to vary the relative duration of the motor phase and generator phase of each said cycle according to said power demand signals.

4. A battery operated electrical power plant for motor driven vehicles as set forth in claim 3 wherein said cyclic switching means comprises:
   a first electronic switch in the motor phase electrical circuitry;
   a second electronic switch in the generator phase electrical circuitry;
   means for generating first and second pulse trains for respectively triggering said first and second electronic switches to be conducting;

means for varying the frequency of said first and second pulse trains inversely with respect to each other according to said power demand signals; and means for coupling the motor phase electric circuitry and generator phase electric circuitry so that when one electric switch is conducting the other is not conducting and so that the durations of the motor phase and the generator phase are respectively proportional to the frequencies of the first and second pulse trains.

5. An electric power plant as set forth in claim 4 wherein said coupling means comprises an AC capacitor connected across the output side of each electronic switches.

6. A battery operated electric power plant for an operator controlled motor driven vehicle comprising:
rechargeable electric storage battery means;
electric motor/generaor means comprising a housing, motor field coils, generator exciter coils, armature means and armature coils, said electric motor/generator means operative to drive the armature when current is supplied to the armature coils and motor field coils for driving the vehicle, said electric motor/generator means operative to generate current in the motor field coils and armature coils when the armature is driven by motion of the vehicle and current is supplied to the generator exciter coils for recharging the battery;
motor phase electrical circuitry for directing storage battery current to the armature coils and motor field coils and a first electronic switch operative to open and close said motor phase electrical circuitry;
generator phase electrical circuitry for directing storage battery current to the generator exciter coils and a second electronic switch operative to open and close said generator phase electrical circuitry;
first pulse generating means for supplying a first pulse train to the gate of the first electronic switch;
second pulse generating means for supplying a second pulse train to the gate of the second electronic switch;
variable position throttle means controllable by the vehicle operator for varying the frequencies of said first and second pulse trains inversely with respect to each other according to the power demand on the electric motor/generator means specified by a given position of said throttle means; and
means for coupling the motor phase electrical circuitry to the generator phase electrical circuitry so that the first and second electronic switches conduct in a repetitive alternate manner to define successive power plant cycles, each cycle having a motor phase during which the electric motor/generator means is operated to drive the vehicle and a generator phase during which the electric motor/generator means is operated to charge the storage battery, said coupling means functioning with said first and second pulse trains to vary the relative duration of the motor phase and generator phase during each cycle according to the frequencies of the first and second pulse trains respectively.

7. A battery operated electric power plant as set forth in claim 6 wherein said coupling means comprises AC capacitance means coupled across the respective outputs of said first and second electronic switches whereby when the first electronic switch is conducting current to the motor coils during the motor phase of a given cycle, back e.m.f. induced in the generator exciter coils shuts off the second electronic switch and charges the AC capacitance means to a predetermined level and whereby when the AC capacitance means is charged to said predetermined level it shuts off the first electronic switch to terminate the motor phase and permits the second electronic switch to become conducting to begin the generator phase and whereby the AC capacitance is subsequently discharged so that the first electronic switch can again conduct to initiate the motor phase of the next cycle.

8. A battery operated electric power plant as set forth in claim 6 wherein said first and second pulse generating means comprise first and second unijunction transistor circuit means for generating first and second pulse trains respectively and wherein said throttle means includes first and second variable resistance means connected across the first and second unijunction transistor circuits respectively for varying the frequencies of said first and second pulse trains and means controllable by the vehicle operator for simultaneously varying said first and second variable resistance means in opposite directions.

9. An electric plant as set forth in claim 6 wherein is provided in the motor/generator means, brush means shiftable between two positions, one position for use in driving the electric motor/generator in one direction and the other position for use in driving the electric motor/generator in the other direction, and wherein is provided means for simultaneously reversing the polarity of current supplied to the generator exciter coils and for shifting the position of said brush means for reversing the direction of drive of the electric motor/generator.

10. A battery operated power plant as set forth in claim 6 wherein said electric motor/generator is provided with means for stepping up the voltage induced in the armature coils during the generator phase.

11. A battery operated electric power plant as set forth in claim 6 wherein said first and second pulse generating means generates pulses in the frequency range of 30–400 cps.

12. A method of electrically powering an operator controlled motor driven vehicle comprising:
driving the vehicle by electric motor means;
generating electricity with generator means driven by motion of the vehicle;
repetitively alternating the steps of driving the vehicle by said motor means and generating electricity by said generator means to define a repetitive operating cycle having a motor phase and a generator phase; and
generating vehicle power demand signals for varying the relative duration of the motor phase and the generator phase during each operating cycle.

13. An electrical power circuit for an operator controlled vehicle driven by an electrical motor, said circuit comprising:
a rechargeable DC voltage source having a plurality of terminals, a first one of said plurality of terminals providing a reference potential;
a dynamoelectric device having an armature and coil;
a second one of said plurality of terminals of said source being coupled to one side of said armature;
an adjustable voltage dropping unit having an input terminal coupled to a third one of said plurality of terminals and an output terminal;

first switching means for repetitively alternately coupling the other side of said armature and the output terminal of said voltage dropping unit to one side of said coil during vehicle motion;

said switching means for coupling the other side of said coil to said reference potential when in a first position defining a first mode of circuit operation and for coupling the other side of said coil to said second terminal when in a second position defining a second mode of circuit operation; and means controllable by the vehicle operator coupled and to said first switching means for generating control signals representative of vehicle power demand for controlling the time period during which said other side of said armature is coupled to said one side of said coil and the time period during which said output terminal of said voltage dropping unit is coupled to said one side of said coil;

said dynamoelectric device being repetitively operated during vehicle motion alternately in a motor phase and a generator phase in said first mode of circuit operation with the duration of said motor and said generator phases depending on said control signals.

14. The combination of claim 13 wherein said first switching means includes first and second electronic switches each having a pair of transfer terminals and a control terminal, said control terminals being coupled to said control signal generating means to receive the associated ones of said control signals.

15. The combination of claim 13 wherein said control signal generating means includes a variable frequency oscillator having an output terminal, and a monostable multivibrator coupled to the output of said oscillator for generating said control signals.

16. The combination of claim 15 wherein said control signal generating means includes throttle means for enabling operator adjustment of the frequency of said oscillator within a predetermined range.

17. The combination of claim 16 wherein said predetermined range is from about 200 to about 1,000 HZ.

18. The combination of claim 13 wherein said circuit further includes converting means adapted to be coupled to an external electrical power source for furnishing a D.C. charging current to said rechargeable D. C. voltage source when said second switching means is in said second position, said converting means including an output terminal coupled via said first switching means to the other side of said coil so that said charging current flows therethrough and to said second one of said plurality of terminals when said circuit is operated in said second mode.

19. The combination of claim 13 wherein said circuit further includes means for adjusting the magnitude of the potential on said second one of said plurality of terminals when said circuit is operated in said first mode.

20. The combination of claim 13 further including third switching means coupled to said coil for permitting the connections to said coil to be reversed.

* * * * *